(12) United States Patent
Pickrell (10) Patent No.: US 10,844,446 B2
(45) Date of Patent: Nov. 24, 2020

(54) PHYSICAL PROPERTY IMPROVEMENT OF IRON CASTINGS USING CARBON NANOMATERIALS

(71) Applicants: DRESSER-RAND COMPANY, Olean, NY (US); Kevin Pickrell, Olean, NY (US)

(72) Inventor: Kevin Pickrell, Olean, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 234 days.

(21) Appl. No.: 14/787,022

(22) PCT Filed: May 8, 2014

(86) PCT No.: PCT/US2014/037255
§ 371 (c)(1),
(2) Date: Oct. 26, 2015

(87) PCT Pub. No.: WO2014/182875
PCT Pub. Date: Nov. 13, 2014

(65) Prior Publication Data
US 2016/0083812 A1 Mar. 24, 2016

Related U.S. Application Data
(60) Provisional application No. 61/821,315, filed on May 9, 2013.

(51) Int. Cl.
| | | |
|---|---|---|
| *C21C 1/10* | (2006.01) | |
| *C21C 1/08* | (2006.01) | |
| *B22D 1/00* | (2006.01) | |
| *B22D 19/14* | (2006.01) | |
| *C22C 26/00* | (2006.01) | |
| *C22C 33/04* | (2006.01) | |
| *C22C 33/08* | (2006.01) | |
| *C22C 47/08* | (2006.01) | |
| *C22C 37/04* | (2006.01) | |
| *B82Y 30/00* | (2011.01) | |

(52) U.S. Cl.
CPC ............... *C21C 1/105* (2013.01); *B22D 1/00* (2013.01); *B22D 19/14* (2013.01); *C21C 1/08* (2013.01);
(Continued)

(58) Field of Classification Search
None
See application file for complete search history.

(56) References Cited

U.S. PATENT DOCUMENTS

| | | | | |
|---|---|---|---|---|
| 6,251,159 B1 * | 6/2001 | Angeliu | ................ | C21D 10/00 148/320 |
| 7,712,512 B2 * | 5/2010 | Suganuma | ........... | B22D 17/007 164/113 |

(Continued)

OTHER PUBLICATIONS

Collins, Philip G., "Defects and Disorder in Carbon Nanotubes", Oxford Handbook of Nanoscience and Technology: Frontiers and Advances, Oxford Univ. Press, 2009.*

(Continued)

*Primary Examiner* — Kevin E Yoon
*Assistant Examiner* — Jacky Yuen (57) ABSTRACT

A method is provided for fabricating iron castings for metallic components. The method for fabricating the iron castings may include forming a molten solution by melting carbon and iron and combining carbon nanomaterials with the molten solution. A first portion of the carbon nanomaterials combined with the molten solution may be dispersed therein. The method may also include cooling the molten solution to solidify at least a portion of the carbon thereof to fabricate the iron castings. The first portion of the carbon nanomaterials may be dispersed in the iron castings.

20 Claims, 3 Drawing Sheets

(52) U.S. Cl.
CPC .............. *C22C 26/00* (2013.01); *C22C 33/04* (2013.01); *C22C 33/08* (2013.01); *C22C 37/04* (2013.01); *C22C 47/08* (2013.01); *B82Y 30/00* (2013.01); *C22C 2026/001* (2013.01); *C22C 2026/002* (2013.01)

(56) References Cited

U.S. PATENT DOCUMENTS

2008/0093577 A1* 4/2008 Khraishi .................. C09K 5/06
  252/67
2009/0311168 A1* 12/2009 Duvall ..................... B01J 6/005
  423/447.5
2010/0015002 A1* 1/2010 Barrera ................... B82Y 30/00
  419/11
2013/0152739 A1* 6/2013 Li .......................... C22C 1/1036
  75/560

OTHER PUBLICATIONS

Neubauer et al., Potential and challenges of metal-matrix-composites reinforced with carbon nanofibers and carbon nanotubes, available online Sep. 22, 2010, Composites Science and Technology 70 (2010) 2228-2236. (Year: 2010).*

* cited by examiner

PHYSICAL PROPERTY IMPROVEMENT OF IRON CASTINGS USING CARBON NANOMATERIALS

CROSS-REFERENCE TO RELATED APPLICATIONS

The present application is a national stage application of PCT Pat. App. No. PCT/US2014/037255, filed May 8, 2014, which claims priority to U.S. Provisional Patent Application having Ser. No. 61/821,315, which was filed May 9, 2013. These priority applications are hereby incorporated by reference in their entirety into the present application, to the extent that they are not inconsistent with the present application.

BACKGROUND

Conventional processes for fabricating alloys of iron and carbon (e.g., cast iron or iron castings) may include melting iron (e.g., iron scraps, pig iron, steel, etc.) to provide an iron solution and dissolving or melting varying concentrations of carbon (e.g., about 2 wt % to about 7 wt %) in the iron solution to form a molten solution, casting the molten solution in a mold, and subsequently cooling or solidifying the molten solution to fabricate the iron castings. As the molten solution is cooled, the carbon dissolved therein may solidify or nucleate about crystal centers or nuclei dispersed therethrough. The nuclei may provide favorable sites for the nucleation and growth of the carbon as a separate solid phase (e.g., graphite). Further cooling of the molten solution may result in the solidification of the iron and carbon, thereby forming the iron castings.

The nucleation and growth of the carbon about the nuclei may form microstructures of the solidified carbon (e.g., graphite) with varying morphologies, which may determine the type of iron castings fabricated. For example, the microstructure of graphite may be or include spheroids or nodules, which may result in the formation of ductile iron castings. The microstructure of graphite may also be or include flakes, which may result in the formation of grey iron castings. In another example, the microstructure of graphite may be or include nodules, flakes, and/or worm-like morphologies having irregular surfaces and rounded edges, which may result in the formation of compacted graphite iron castings, or vermicular iron.

The microstructures of graphite may have implications in determining the characteristics and properties of the iron castings. For example, the flakes of graphite in grey iron castings may provide a material with increased damping and thermal conductivity as compared to ductile iron castings having nodules of graphite. However, the flakes of graphite in grey iron castings may also provide a material with decreased tensile strength and increased brittleness as compared to ductile iron castings. In another example, the nodules, flakes, and/or the worm-like particles of graphite in compacted graphite iron castings may provide a material with thermal conductivity and damping properties similar to grey iron castings and tensile strength and stiffness comparable to that of ductile iron castings. These aforementioned examples evidence the pronounced influence that the microstructures of graphite have in determining the characteristics and properties of the resulting iron castings.

In view of the foregoing, attempts have been made to control the morphology of the microstructures of graphite via inoculation of the molten solution to thereby control the type and/or properties of the iron castings fabricated. Inoculation may include providing one or more additives, or inoculants, to the molten solution to selectively promote the formation of particular microstructures. For example, magnesium is often provided in the molten solution to promote the formation of nodules and thereby promote the formation of ductile iron castings. Inoculation of the molten solution may also be utilized to increase the availability of nuclei or nucleation sites contained therein to promote the nucleation and growth of the carbon. In addition to promoting the nucleation and growth of the carbon, attempts have also been made to discover or create new morphological microstructures of graphite to form iron castings with desirable combinations of characteristics and properties. However, the majority of these attempts have not been successful or have resulted in iron castings with characteristics or properties that limit their application for industrial purposes.

What is needed, then, are methods for improving iron casting for metallic components via the introduction of unique microstructures of graphite by controlling nucleation and growth thereof and/or the introduction of varying carbon nanomaterials that are stable or dispersed within the molten solution, such that the carbon nanomaterials are retained in the iron casting upon solidification or cooling of the molten solutions.

SUMMARY

Embodiments of the disclosure may provide a method for fabricating iron castings for a metallic component. The method for fabricating the iron castings may include forming a molten solution by melting carbon and iron and combining carbon nanomaterials with the molten solution. A first portion of the carbon nanomaterials combined with the molten solution may be dispersed therein. The method may also include cooling the molten solution to solidify at least a portion of the carbon thereof to fabricate the iron castings. The first portion of the carbon nanomaterials may be dispersed in the iron castings.

Embodiments of the disclosure may provide another method for fabricating iron castings for a metallic component. The method may include forming a molten solution by dissolving carbon in an iron solution and combining carbon nanomaterials with the molten solution. At least a portion of the carbon nanomaterials combined with the molten solution may be dispersed therein. The method may also include cooling the molten solution to solidify the carbon dissolved in the iron solution to fabricate the iron castings, where at least a portion of the carbon nanomaterials may be dispersed in the iron castings.

Embodiments of the disclosure may provide another method for fabricating iron castings for a metallic component. The method may include forming a molten solution by melting iron and carbon, where the carbon may be dissolved in the melted iron. The method may also include combining the molten solution with carbon nanomaterials and transferring the molten solution to a mold. The method may further include cooling the molten solution in the mold to solidify the carbon dissolved in the melted iron to fabricate the iron castings. The iron castings may have the carbon nanomaterials dispersed therein, and at least a portion of the carbon dissolved in the melted iron may solidify about the carbon nanomaterials.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
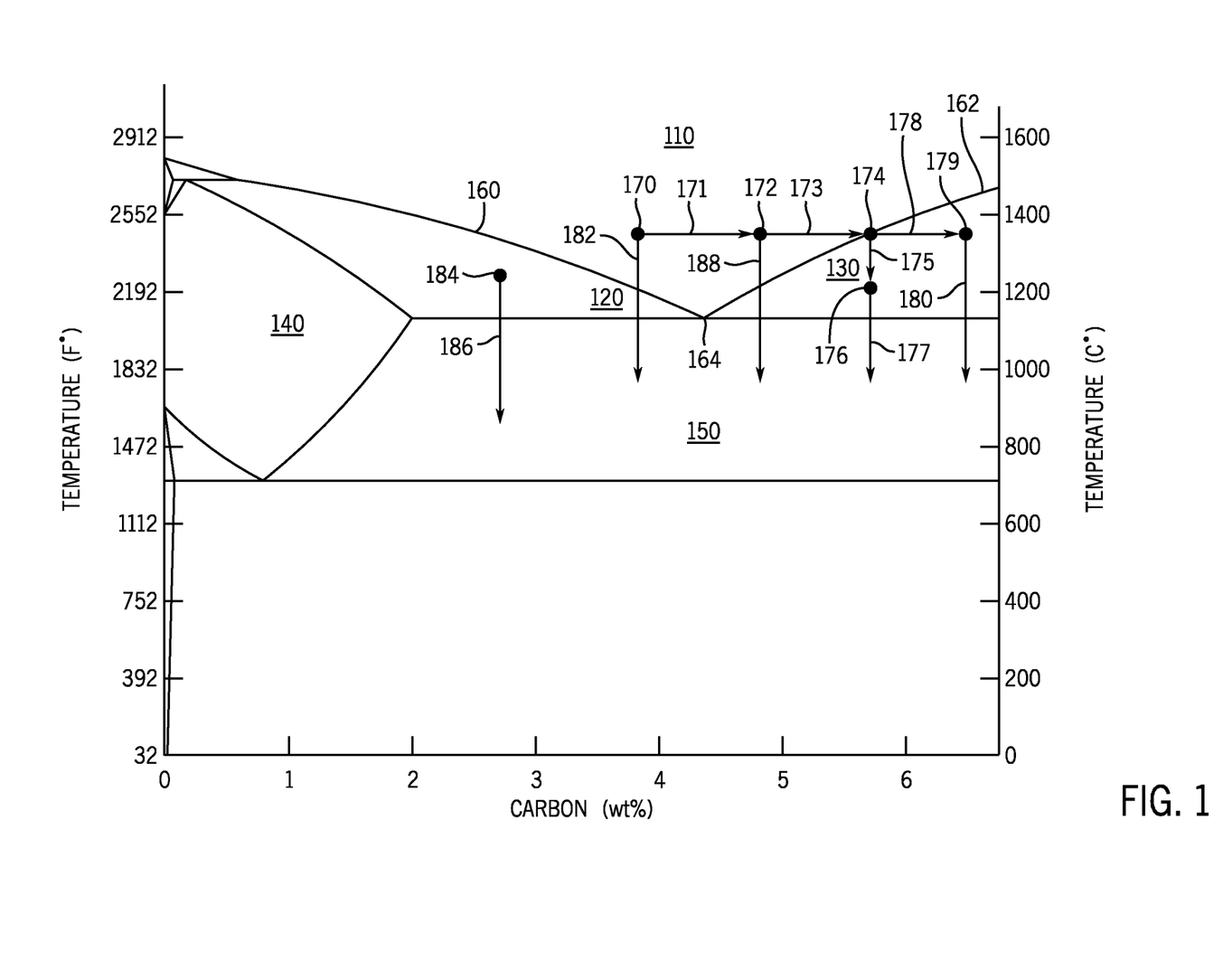
FIG. 1 illustrates a phase diagram representing the general principles of fabricating iron castings from molten solutions of iron and carbon, according to one or more embodiments disclosed.

FIG. 1 illustrates a phase diagram representing the general principles of fabricating iron castings from molten solutions of iron and carbon, according to one or more embodiments. As illustrated in FIG. 1, the phase diagram may include at least five distinct regions including a molten or liquid region 110, two liquid/solid regions 120, 130, and two solid/solid regions 140, 150. The regions 110, 120, 130, 140, 150 of the phase diagram may determine the phase, or state, of the iron and/or carbon. For example, the molten region 110 may include a liquid or molten solution of iron and carbon. In at least one embodiment, the molten solution in the molten region 110 may also include one or more additional elements or constituents, such as alloying elements and/or inoculants, which may be dissolved therein. The molten solution in the molten region 110 may have varying concentrations of carbon contained therein. For example, the molten solution in the molten region 110 may have a concentration of carbon (e.g., initial concentration of carbon) that may promote the formation of grey iron castings, ductile iron castings, or compacted graphite iron castings.

The first liquid/solid region 120 and the second liquid/solid region 130 may include a molten solution of iron and carbon having solidified iron (i.e., iron in a solid phase) and/or solidified carbon (i.e., carbon in a solid phase) dispersed therein. For example, the first liquid/solid region 120 may include a molten solution of iron and carbon having a solidified material of iron and carbon dispersed therein, and the second liquid/solid region 130 may include a molten solution of iron and carbon having solidified carbon dispersed therein. Similar to the molten solution in the molten region 110, the molten solutions in the first and second liquid/solid regions 120, 130 may also include the additional elements (e.g., alloying elements and/or inoculants). The first and second solid/solid regions 140, 150 may include iron castings of solidified iron and/or solidified carbon. For example, the first and second solid/solid regions 140, 150 may include solidified iron, carbon, and/or alloys thereof, as further described herein. As illustrated in FIG. 1, the region 110, 120, 130, 140, 150 of the phase diagram in which the iron and carbon may exist may be determined, at least in part, by the temperature (i.e., y-axis) thereof. Further, as illustrated in FIG. 1, the region 110, 120, 130, 140, 150 of the phase diagram in which the iron and carbon may exist may also be determined, at least in part, by the concentration or weight percent (wt. %) of the carbon relative to the iron (i.e., x-axis).

As illustrated in FIG. 1, the phase diagram may include an iron solubility line 160 and a carbon solubility line 162. The iron solubility line 160 and the carbon solubility line 162 may intersect at an equilibrium or eutectic point 164. The eutectic point 164 may define a eutectic temperature and a eutectic concentration for iron and carbon. At the eutectic point 164, an equilibrium may exist between the molten solution of iron and carbon, the solidified iron, and the solidified carbon. For example, at the eutectic point 164, a first portion of the iron and carbon may exist as solids and a second portion of the iron and carbon may exist as a liquid in the molten solution. In at least one embodiment, the eutectic temperature may be about 1147° C. (about 2097° F.) and the eutectic concentration may be about 4.3 wt. % of carbon. In at least one embodiment, the concentration of carbon in the molten solution may be less than the eutectic concentration, thereby providing a hypoeutectic molten solution, indicated by point 170. In another embodiment, the concentration of carbon in the molten solution may be greater than the eutectic concentration, thereby providing a hypereutectic molten solution, indicated by point 172. The concentration of carbon in the molten solution may also be at the eutectic concentration, thereby providing a eutectic molten solution.

In at least one embodiment, carbon and/or one or more carbon containing materials may be contacted or combined with the molten solutions of iron and carbon. As further described herein, the carbon and/or carbon containing materials may include carbon nanomaterials. In at least one embodiment, at least a portion of the carbon nanomaterials combined with the molten solution may be stable and may not dissolve or degrade therein. Accordingly, the carbon nanomaterials combined with the molten solution may be dispersed therein as a solid, or in a solid phase. In another embodiment, at least a portion of the carbon nanomaterials may be dissolved in the molten solution to increase the concentration of carbon therein. For example, the carbon nanomaterials may be combined with the molten solution and a first portion of the carbon nanomaterials may be dissolved therein and a second portion of the carbon nanomaterials may be dispersed therein as a solid. In at least one embodiment, at least a portion of the carbon nanomaterials dispersed as a solid in the molten solution may provide nuclei, or nucleation sites, during the fabrication of the iron castings, as further described herein. In another embodiment, at least a portion of the carbon nanomaterials dispersed as a solid in the molten solution may not provide nuclei during the fabrication of the iron castings. Accordingly, the carbon nanomaterials may be retained in the iron casting upon cooling and solidification of the molten solution.

As discussed above, at least a portion of the carbon nanomaterials may be combined with and dissolved in the molten solution to increase the concentration of carbon contained therein. For example, the carbon nanomaterials may be combined with the hypoeutectic molten solution 170 to increase the concentration of carbon contained therein. Accordingly, a sufficient amount of the carbon nanomaterials may be combined with the hypoeutectic molten solution 170 to increase the concentration of carbon therein, as indicated by arrow 171, thereby forming the hypereutectic molten solution 172. As further discussed above, at least a portion of the carbon nanomaterials combined with the molten solution may be stable and may not dissolve or degrade therein. Accordingly, the carbon nanomaterials combined with the hypoeutectic molten solution 170 may exist as a solid dispersed therein.

In at least one embodiment, the concentration of carbon in the hypereutectic molten solution 172 may be increased until the carbon solubility line 162 is reached, thereby providing a saturated molten solution, indicated by point 174. Accordingly, a sufficient amount of the carbon nanomaterials may be combined with the hypereutectic molten solution 172 to increase the concentration of carbon therein, as indicated by arrow 173, thereby forming the saturated molten solution 174. In another embodiment, the carbon nanomaterials combined with the hypereutectic molten solution 172 may be stable and may not dissolve or degrade therein. Accordingly, the carbon nanomaterials combined with the hypereutectic molten solution 172 may exist as a solid dispersed therein.

In at least one embodiment, the carbon nanomaterials may be combined with the saturated molten solution 174, as indicated by the arrow 178. The carbon nanomaterials combined with the saturated molten solution 174 may be stable and may not dissolve or degrade therein. Accordingly, the carbon nanomaterials combined with the saturated molten solution 174 may exist as a solid dispersed therein, thereby forming a semi-solid solution, indicated by point 179, in the second liquid/solid region 130. In at least one embodiment, the semi-solid solution 179 may include a molten solution of iron and carbon having solidified carbon dispersed therein. In another embodiment, the semi-solid solution 179 may include a molten solution of iron and carbon having solidified carbon and the carbon nanomaterials (e.g., carbon nanomaterials) dispersed therein.

As discussed above, the carbon nanomaterials combined with the hypoeutectic molten solution 170, the hypereutectic molten solution 172, or the saturated molten solution 174 may be stable and may not dissolve or degrade therein. Accordingly, the carbon nanomaterials combined with the molten solutions 170, 172, 174 may exist as a solid dispersed therein. In at least one embodiment, the stability of the carbon nanomaterials combined with the molten solutions 170, 172, 174 may be provided by the concentration of carbon contained therein. For example, the concentration of carbon in the molten solutions 170, 172, 174 may be sufficiently high, such that at least a portion of the carbon nanomaterials may not dissolve or degrade when combined with the molten solutions 170, 172, 174. In another embodiment, the stability of the carbon nanomaterials combined with the molten solutions 170, 172, 174 may be provided by one or more properties of the carbon nanomaterials. For example, a melting point of the carbon nanomaterials may be greater than the temperature of the molten solutions 170, 172, 174. Accordingly, the carbon nanomaterials may not dissolve or degrade when combined with the molten solutions 170, 172, 174. As such, the carbon nanomaterials may be retained in the iron casting upon solidification of the molten solutions.

While the embodiments disclosed herein describe combining the carbon nanomaterials with the hypoeutectic molten solution 170, the hypereutectic molten solution 172, and the saturated molten solution 174, it may be appreciated that the carbon nanomaterials may be combined with any molten solution where at least a portion of the iron exists as a solution. For example, as illustrated in FIG. 1, the carbon nanomaterials may be combined with a semi-solid solution, in the first liquid/solid region 120, indicated by point 184, and/or the semi-solid solution 179 in the second liquid/solid region 130. Further, while FIG. 1 illustrates combining the carbon nanomaterials with the molten solutions at an isothermal temperature, as indicated by arrows 171, 173, 178, it may be appreciated that the carbon nanomaterials may be combined with the molten solutions at any temperature where at least a portion of the iron exists as a solution. Further, the temperature of the molten solution may be increase and/or decreased during and/or after combining the carbon nanomaterials therewith.

As discussed above, one or more additional elements or constituents may be combined with the molten solutions. The elements or constituents may include, but are not limited to, alloying elements and/or inoculants. Illustrative alloying elements may include, but are not limited to, silicon, phosphorus, tin, antimony, chrome, copper, or the like. Illustrative inoculants may include, but are not limited to, aluminum, calcium, barium, strontium, zirconium, rare earth elements, and any compounds thereof, or any combination thereof.

The temperature of the molten solution may be reduced to solidify or nucleate at least a portion of the carbon dissolved therein. In at least one embodiment, the solidification of the carbon dissolved in the molten solution may result in the formation of a semi-solid solution. For example, as illustrated in FIG. 1, reducing the temperature of the saturated molten solution 174, as indicated by arrow 175, may decrease the solubility of carbon dissolved therein. As the solubility of carbon is decreased, at least a portion of the carbon dissolved in the saturated molten solution 174 may solidify, thereby forming a semi-solid solution, as indicated by point 176. The temperature of the semi-solid solution 176 may be further reduced to or below the eutectic temperature, as indicated by arrow 177, to solidify the iron and carbon contained therein and thereby fabricate the iron casting.

While the embodiments disclosed herein describe cooling the saturated molten solution 174 to fabricate the iron castings, it may be appreciated that any molten solution including the molten solutions in the first and second liquid/solid regions 120 and 130 may be combined with the carbon nanomaterials and subsequently cooled to fabricate the iron castings. For example, the carbon nanomaterials may be combined with the molten solutions of the semi-solid solutions 179, 184 and the temperature thereof may be reduced to or below the eutectic temperature, as indicated by arrows 180 and 186, respectively, to solidify the iron and carbon contained therein and thereby fabricate the iron castings. In another example, the carbon nanomaterials may be combined with the hypoeutectic molten solution 170 and/or the hypereutectic molten solution 172 and the temperature thereof may be reduced to or below the eutectic temperature, as indicated by arrows 182 and 188, respectively, to solidify the iron and carbon contained therein and thereby fabricate the iron castings.

As discussed above, during the cooling of the molten solution, at least a portion of the carbon dissolved therein may solidify about crystal centers or nuclei, which may be or include any favorable site for the solidification and growth of the carbon. In at least one embodiment, at least a portion of the carbon dissolved in the molten solution may solidify on or about the carbon nanomaterials dispersed therein as a solid. For example, the crystal centers or nuclei may be provided by the solid carbon nanomaterials, and the carbon dissolved in the molten solutions may solidify on and/or about the carbon nanomaterials upon cooling. Solidification of the carbon on and/or about the carbon nanomaterials may provide unique microstructures of graphite or solidified carbon, as further described herein. In another embodiment, at least a portion of the carbon dissolved in the molten solution may not solidify about the carbon nanomaterials during the fabrication of the iron casting. Accordingly, the carbon nanomaterials may be retained in the iron castings. Said in another way, the carbon nanomaterials may be dispersed in the metal matrix of the iron castings.

In at least one embodiment, one or more properties of the iron castings may be determined, at least in part, by the morphologies or microstructures of the solidified carbon contained therein. Illustrative properties of the iron castings that may be determined by the microstructures of the solidified carbon may include, but are not limited to, strength, such as fatigue strength and/or tensile strength, ductility, heat transfer rate, thermal stability, lubricity, sound dampening, machinability, weight, hardness, toughness, or any combination thereof. In at least one embodiment, the microstructures of the solidified carbon may be determined, at least in part, by the rate in which the temperature of the molten solution is reduced in the fabrication of the iron casting. The microstructures of the solidified carbon may also be determined, at least in part, by the initial melting temperature of the molten solutions. The microstructures of the solidified carbon may also be determined, at least in part, by the concentration of carbon contained in the molten solutions and/or the concentration of the carbon nanomaterials combined therewith. In another embodiment, the microstructure of graphite may be determined, at least in part, by the type of carbon nanomaterials combined with the molten solutions. For example, the microstructures of the solidified carbon may be determined by the number or availability of nuclei or nucleation sites for the carbon dissolved in the molten solution, which may be determined by the type of carbon nanomaterials combined with the molten solutions, as further described herein.

The carbon nanomaterials may include molecular structures having one or more arrays of carbon atoms coupled with one another. For example, the carbon nanomaterials may include, but are not limited to, nano-scale molecular structures (e.g., having at least one dimension less than 100 nanometers) having pentagonal, hexagonal, and/or heptagonal arrays of carbon atoms coupled with one another. In at least one embodiment, the carbon nanomaterials may be coupled with and/or aggregated with one another forming carbon-based structures and/or materials larger than nano-scale molecular structures (e.g., carbon cloth, carbon yarns, carbon ropes, etc.). Illustrative carbon nanomaterials may include, but are not limited to, fullerenes, graphene, carbon nanotubes, or any combination thereof. Illustrative fullerenes may include, but are not limited to, C60, C70, C76, C84, and the like. Graphene may include a two-dimensional sheet of hexagonally arrayed carbon atoms having a thickness of a single carbon atom.

Carbon nanotubes may include molecules having a generally elongated hollow, tubular structure. The hollow, tubular structure of the carbon nanotubes may include straight or bent sidewalls and the ends of the tubular structure may be open and/or closed. The carbon nanotubes may be single-walled nanotubes, double-walled nanotubes, and/or multi-walled nanotubes. The carbon nanotubes may be purified carbon nanotubes and/or crude carbon nanotubes (e.g., as synthesized). The carbon nanotubes may be bare or pristine carbon nanotubes and/or functionalized carbon nanotubes. Further, any of the carbon nanomaterials described herein may also be pristine carbon nanomaterials and/or functionalized carbon nanomaterials. Pristine carbon nanomaterials may include carbon nanomaterials that have not been subjected to any surface modification treatments subsequent to synthesis and/or purification thereof. Functionalized carbon nanomaterials may include carbon nanomaterials that may have been subjected to a surface modification treatment such that one or more functional chemical moiety or moieties are associated therewith. For example, functionalized carbon nanotubes may include carbon nanotubes that have undergone a surface modification treatment such that one or more functional chemical moiety or moieties are associated with the sidewalls and/or the ends of the hollow, tubular structure. In at least one embodiment, the carbon nanomaterials may be functionalized with the chemical moiety or moieties to modify one or more properties (e.g., mechanical, thermal, electrical, solubility, etc.) thereof. For example, the carbon nanotubes may be functionalized to increase and/or decrease the melting point thereof. The chemical moiety or moieties of the functionalized carbon nanotubes may also be provided to increase and/or decrease the availability of nuclei or nucleation sites in the molten solutions.

In at least one embodiment, the sidewalls and/or the ends of the carbon nanotubes may include one or more structural defects. For example, the sidewalls and/or ends of the carbon nanotubes may include pentagonal and/or heptagonal arrays of carbon atoms, as opposed to hexagonal arrays of carbon atoms. In another example, the carbon nanotubes may also include one or more vacancies in the sidewalls and/or the ends thereof. The structural defects in the carbon nanotubes may modify one or more properties thereof. For example, the structural defects may decrease the melting point in the carbon nanotubes. In at least one embodiment, the degree or magnitude in which the properties (e.g., melting point) of the carbon nanotubes are modified may be determined, at least in part, by the number or amount of structural defects present, referred to as the defect density. For example, carbon nanotubes with greater defect densities may exhibit lower melting points as compared to carbon nanotubes with lower defect densities.

In at least one embodiment, the carbon nanomaterials may include carbon nanomaterial composites. The carbon nanomaterial composites may be or include a material containing any one or more of the carbon nanomaterials and at least one other constituent coupled and/or combined with (e.g., chemically and/or physically) one another. Illustrative carbon nanomaterial composites may include, but are not limited to, metal-oxide/carbon nanomaterial composites, metal/carbon nanomaterial composites, and the like. In at least one embodiment, the carbon nanomaterial composites may be provided to increase and/or decrease the availability of nuclei or nucleation sites in the molten solutions.

As discussed above, the microstructures of the solidified carbon in the iron castings may be determined, at least in part, by the carbon nanomaterials combined with the molten solutions. In at least one embodiment, the carbon nanomaterials combined with the molten solutions may not dissolve therein. As such, the carbon nanomaterials may be dispersed therein as a solid, or in a solid phase. The molten solutions having the carbon nanomaterials dispersed therein may be cooled to fabricate the iron castings. In at least one embodiment, at least a portion of the carbon dissolved in the molten solutions may solidify or nucleate on and/or about the nanomaterials during the fabrication of the iron castings. For example, the carbon nanomaterials may include carbon nanotubes, and the carbon nanotubes may provide nuclei for the solidification of the carbon dissolved in the molten solutions during the fabrication of the iron castings. In at least one embodiment, the sidewalls and/or the ends of the tubular structure of the carbon nanotubes may provide nucleation sites for the carbon dissolved in the molten solutions. For example, the side walls and/or the ends of the carbon nanotubes may include hexagonal arrays of carbon that may provide favorable nucleation sites for the carbon. In another example, the structural defects of the sidewalls and/or the ends of the carbon nanotubes may provide favorable nucleation sites for the carbon. Accordingly, as the temperatures of the molten solutions are reduced and the solubility of the carbon dissolved therein is decreased, the carbon may solidify on and/or about the tubular structure of the carbon nanotube.

In at least one embodiment, the solidification of the carbon on and/or about the carbon nanotubes may provide unique or varying microstructures of the solidified carbon in the iron castings. For example, at least a portion of the carbon may selectively solidify at or near the ends of the tubular structure, thereby forming microstructures of the solidified carbon having a dumbbell-like morphology. In another example, at least a portion of the carbon may selectively solidify about the sidewall of the tubular structure, thereby forming microstructures of the solidified carbon having a rod-like morphology. In at least one embodiment, the microstructures of the solidified carbon may be determined, at least in part, by the presence and/or absence of structural defects along the tubular structure. For example, at least a portion of the carbon may selectively solidify at or near the defects along the tubular structure. Accordingly, the solidification of the carbon on and/or about the tubular structure and the resulting microstructures of the solidified carbon in the iron castings may be determined, at least in part, by the location and/or defect density of the carbon nanotube.

The microstructures of the solidified carbon in the iron castings may also be determined, at least in part, by the type or variation of carbon nanomaterials utilized. For example, functionalized carbon nanotubes may be utilized to selectively increase and/or decrease the solidification of the carbon on and/or about the tubular structure thereof. In another example, the purity of the carbon nanomaterials may determine, at least in part, the uniformity or consistency of the microstructures of the solidified carbon in the iron castings fabricated. For example, utilizing purified carbon nanotubes may provide more uniform microstructures of the solidified carbon as compared to utilizing crude carbon nanotubes.

In at least one embodiment, the tubular structure of the carbon nanotubes combined with the molten solutions may have varying defect densities. As discussed above, the defect density of the carbon nanotubes may determine the melting point thereof. Accordingly, carbon nanotubes having a greater defect density may preferentially decompose or dissolve over carbon nanotubes having a lower defect density when combined with the molten solutions. The preferential dissolution of the carbon nanotubes may provide a method of purifying the carbon nanotubes. For example, carbon nanotubes having varying defect densities may be combined with the molten solutions to increase the concentration of carbon therein. The carbon nanotubes having a greater defect density and thus a lower melting point may preferentially dissolve in the molten solutions over those having a lower defect density and thus a higher melting point, thereby leaving the carbon nanotubes having a lower defect density intact as a solid in the molten solutions. In at least one embodiment, the temperatures of the molten solutions may be varied or controlled during the fabrication of the iron castings to preferentially decompose or dissolve the carbon nanotubes having greater defect densities over those having a lower defect density. For example, the temperature may be maintained, increased, or decreased to preferentially decompose carbon nanotubes having varying defect densities. In another example, the length of time in which the carbon nanotubes may be exposed to the varying temperatures may also be controlled to preferentially decompose or dissolve the carbon nanotubes.

The iron castings fabricated from the molten solutions described herein may be used in the fabrication of one or more metallic components. The iron castings fabricated from the molten solutions described herein may be or include iron, carbon, the additional elements or constituents (e.g., alloying elements or inoculants), the carbon nanomaterials (e.g., carbon nanomaterials), or any combination thereof. For example, the iron castings may be or include an alloy of iron and carbon (e.g., cast iron). In another example, the iron castings may be or include an alloy of iron, carbon (e.g., graphite), and the carbon nanomaterials. In another example, the iron castings may be or include an alloy of iron and carbon having the carbon nanomaterials dispersed therein.

The carbon nanomaterials may be contacted or combined with any of the molten solutions in various methods and/or techniques to provide a more uniform distribution or dispersion of the carbon nanomaterials in the molten solutions. For example, the carbon nanomaterials may be combined with the molten solutions via one or more high temperature metal processing operations. The high temperature metal processing operations may include, but are not limited to, a foundry method or process, and the carbon nanomaterials may be combined with the molten solutions during one or more steps of the foundry method. For example, the carbon nanomaterials may be combined with the molten solutions in one or more melting furnaces, ladles, metal treatment boxes, or any combination thereof. Illustrative furnaces may include, but are not limited to, electric induction furnaces, cupolas, electric arc furnaces, rotary furnaces, gas-fired furnaces, such as gas-fired shaft and resistance furnaces, gas and oil-fired crucible furnaces, or any combination thereof. Illustrative ladles may include, but are not limited to, one or more treatment ladles, transfer ladles, pouring ladles, pouring boxes, or any combination thereof. In at least one embodiment, the carbon nanomaterials may be combined with the molten solutions by providing the carbon nanomaterials in a treatment pocket of a treatment ladle and contacting the molten solutions with the carbon nanomaterials in the treatment pocket of the treatment ladle. Contacting the molten solutions with the carbon nanomaterials in the treatment pocket may result in a turbulent reaction that may disperse the carbon nanomaterials within the molten solutions. In another embodiment, the carbon nanomaterials may be combined with the molten solutions via a rotating head (e.g., rotating ceramic head) inside a ladle. For example, the carbon nanomaterials may be transferred to and/or about an impeller of the rotating head in the ladle. In at least one embodiment, the carbon nanomaterials may be transferred to and/or about the impeller via a shaft coupled with the rotating head.

In at least one embodiment, the carbon nanomaterials may be combined with the molten solutions in one or more process and/or transfer streams. Illustrative process and/or transfer streams may include, but are not limited to one or more inoculation streams, streams in hollow stopper rod injections, transfer streams, such as streams from ladles to molds, or any combination thereof. In at least one embodiment, the carbon nanomaterials may be contacted or combined with the molten solutions in a mold before, during, and/or after the molten solutions are introduced thereto. For example, the carbon nanomaterials may be provided in the mold and the molten solutions may be subsequently introduced or flowed thereto to contact or combine the carbon nanomaterials with the molten solutions. The molten solutions may be introduced or flowed to the mold via any of the process and/or treatment streams of the high temperature metal processing operations. The introduction or flow of the process and/or treatment streams to the mold containing the carbon nanomaterials may provide a more uniform distribution of the carbon nanomaterials within the molten solutions. For example, contacting or combining the molten solutions from the process and/or treatment streams with the carbon nanomaterials may result in a turbulent reaction that may disperse the carbon nanomaterials in the molten solutions. In at least one embodiment, a filter, such as a cellular ceramic filter, may be utilized with the molds, the process streams, and/or the transfer streams to provide a more uniform distribution or dispersion of the carbon nanomaterials within the molten solutions. For example, at least a portion of the carbon nanomaterials may be aggregated or agglomerated with one another. The agglomerated carbon nanomaterials may be contacted with and/or flowed through the filter to at least partially separate the carbon nanomaterials from one another, thereby reducing the agglomeration thereof.

The iron castings described herein may be used in the fabrication of any systems, devices, apparatus, assemblies, or metallic components thereof, that may utilize alloys of iron. For example, the iron castings may be used in the fabrication of one or more turbomachines and/or metallic components thereof. Illustrative turbomachines may include, but are not limited to, turbines, compressors, pumps, and the like. Illustrative metallic components that may be fabricated from the iron castings may include, but are not limited to, inlet guide vanes, exit guide vanes, buckets, exhausts, shrouds, housings or casings, seal rings, blades, discs, rotor wheels, nozzles, diffusers, stages, rotary shafts, diaphragms, rods, sleeves, pistons, support assemblies, bearing assemblies, or the like.

Figure 2:
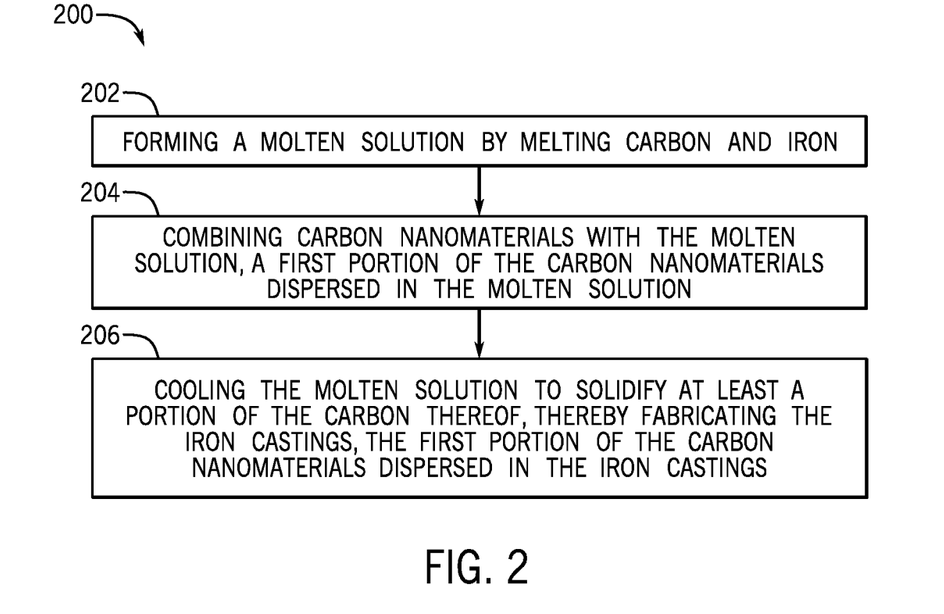
FIG. 2 illustrates a flowchart of a method for fabricating iron castings for a metallic component, according to one or more embodiments disclosed.

FIG. 2 illustrates a flowchart of a method 200 for fabricating iron castings for a metallic component, according to one or more embodiments. The method 200 may include forming a molten solution by melting carbon and iron, as shown at 202. The method 200 may also include combining carbon nanomaterials with the molten solution, a first portion of the carbon nanomaterials dispersed in the molten solution, as shown at 204. The method 200 may further include cooling the molten solution to solidify at least a portion of the carbon thereof, thereby fabricating the iron castings, the first portion of the carbon nanomaterials dispersed in the iron castings, as shown at 206.

Figure 3:
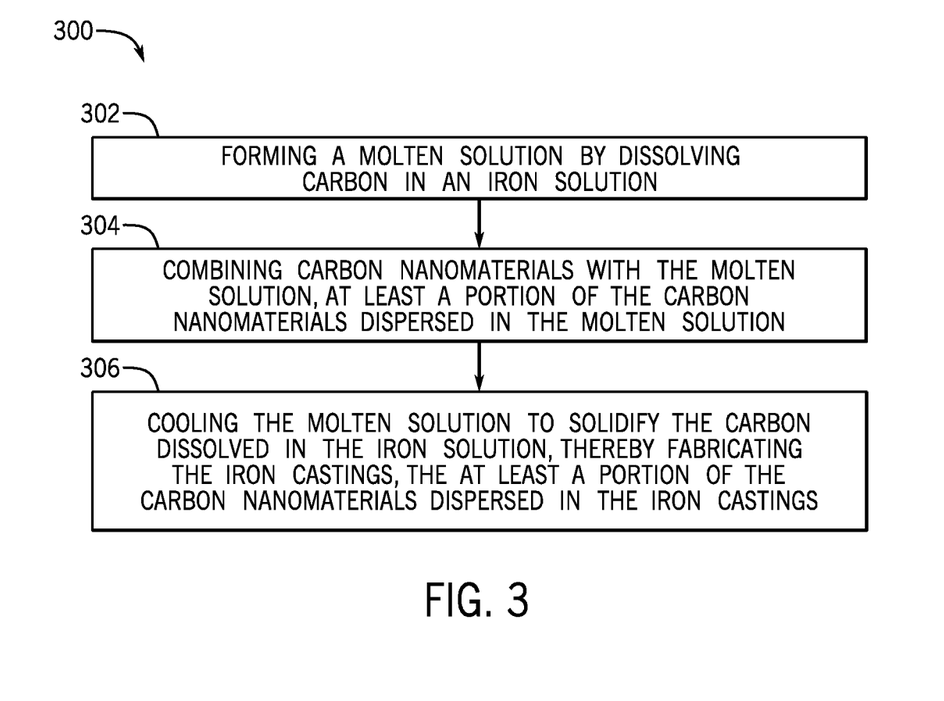
FIG. 3 illustrates a flowchart of another method for fabricating iron castings for a metallic component, according to one or more embodiments disclosed.

FIG. 3 illustrates a flowchart of another method 300 for fabricating iron castings for a metallic component, according to one or more embodiments. The method 300 may include forming a molten solution by dissolving carbon in an iron solution, as shown at 302. The method 300 may also include combining carbon nanomaterials with the molten solution, at least a portion of the carbon nanomaterials dispersed in the molten solution, as shown at 304. The method 300 may further include cooling the molten solution to solidify the carbon dissolved in the iron solution, thereby fabricating the iron castings, the at least a portion of the carbon nanomaterials dispersed in the iron castings, as shown at 306.

Figure 4:
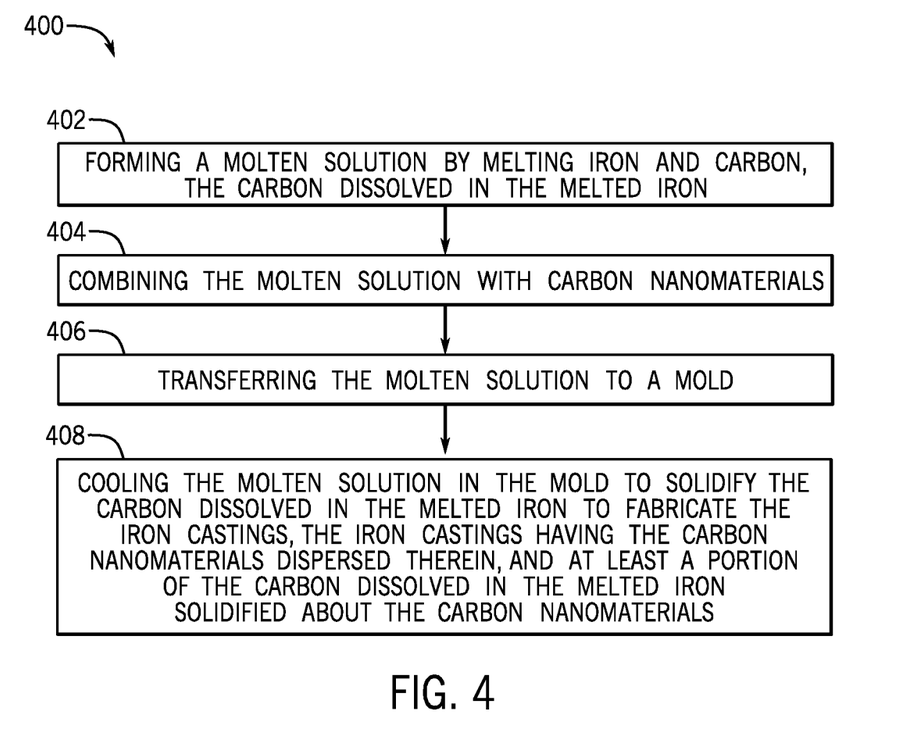
FIG. 4 illustrates a flowchart of another method for fabricating iron castings for a metallic component, according to one or more embodiments disclosed.

FIG. 4 illustrates a flowchart of another method 400 for fabricating iron castings for a metallic component, according to one or more embodiments. The method 400 may include forming a molten solution by melting iron and carbon, the carbon dissolved in the melted iron, as shown at 404. The method 400 may also include combining the molten solution with carbon nanomaterials, as shown at 404. The method 400 may further include transferring the molten solution to a mold, as shown at 406. The method 400 may also include cooling the molten solution in the mold to solidify the carbon dissolved in the melted iron to fabricate the iron castings, the iron castings having the carbon nanomaterials dispersed therein, and at least a portion of the carbon dissolved in the melted iron solidified about the carbon nanomaterials, as shown at 408.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A method for fabricating iron castings for a metallic component, comprising:
forming a molten solution by melting carbon and iron;
combining carbon nanomaterials with the molten solution, a first portion of the carbon nanomaterials dispersed in the molten solution;
functionalizing the carbon nanomaterials such that one or more chemical moieties are associated therewith;
cooling the molten solution to solidify at least a portion of the carbon thereof, thereby fabricating the iron castings, the first portion of the carbon nanomaterials dispersed in the iron castings,
wherein the carbon nanomaterials comprise carbon nanotubes having a tubular structure,
wherein the functionalizing comprises subjecting the carbon nanotubes to a surface modification treatment so that said at least portion of the carbon of the molten solution selectively solidifies about a location of the tubular structure based on the one or more chemical moieties associated with the carbon nanomaterials; and
dissolving a second portion of the carbon nanomaterials in the molten solution, the second portion of the carbon nanomaterials having a defect density greater than a defect density of the first portion of the carbon nanomaterials, wherein the greater defect density of the second portion of the carbon nanomaterials is arranged to achieve a lower melting point in the second portion of the carbon nanomaterials compared to a melting point of the first portion of the carbon nanomaterials dispersed in the iron castings,
wherein a temperature of the molten solution is controlled during the fabricating of the iron castings to preferentially dissolve the second portion of the carbon nanomaterials having the greater defect density to increase a concentration of carbon in the molten solution effective to fabricate a respective type of iron casting from a plurality of iron casting types.

2. The method of claim 1, wherein the carbon nanomaterials further comprise buckyballs, fullerenes, and combinations thereof.

3. The method of claim 1, wherein the carbon nanomaterials increase nucleation sites for the solidification of the at least a portion of the carbon dissolved in the molten solution.

4. The method of claim 1, wherein said at least portion of the carbon of the molten solution solidifies about an end of the tubular structure.

5. The method of claim 1, wherein said at least portion of the carbon of the molten solution solidifies about a sidewall of the tubular structure.

6. The method of claim 1, further comprising varying a concentration of carbon melted in the molten solution.

7. The method of claim 1, wherein the molten solution is cooled in a mold to fabricate the iron castings, the iron castings having the carbon nanomaterials dispersed therein.

8. The method of claim 1, wherein the at least a portion of the carbon solidifies on the first portion of the carbon nanomaterials dispersed in the molten solution, thereby forming microstructures of solidified carbon.

9. The method of claim 1, further comprising combining an alloying element with the molten solution; and varying a concentration of the alloying element in the molten solution.

10. The method of claim 1, wherein the respective type of iron casting is selected from the group consisting of a grey iron casting, a ductile iron casting, and a compacted graphite iron casting.

11. A method for fabricating iron castings for a metallic component, comprising:
forming a molten solution by dissolving carbon in an iron solution,
combining carbon nanomaterials with the molten solution, a first portion of the carbon nanomaterials dispersed in the molten solution;
functionalizing the carbon nanomaterials such that one or more chemical moieties are associated therewith;
cooling the molten solution to solidify the carbon dissolved in the iron solution, thereby fabricating the iron castings, the first portion of the carbon nanomaterials dispersed in the iron castings,
wherein the carbon nanomaterials comprise carbon nanotubes,
wherein the functionalizing is configured to vary a number of nucleation sites for the solidification of said at least portion of the carbon dissolved in the molten solution based on the one or more chemical moieties associated with the carbon nanomaterials; and
dispersing a second portion of the carbon nanomaterials in the melted iron of the molten solution, the second portion of the carbon nanomaterials having a defect density greater than a defect density of the first portion of the carbon nanomaterials,
wherein the greater defect density of the second portion of the carbon nanomaterials is arranged to achieve a lower melting point in the second portion of the carbon nanomaterials compared to a melting point of the first portion of the carbon nanomaterials dispersed in the iron castings,
wherein a temperature of the molten solution is controlled during the fabricating of the iron castings to preferentially dissolve the second portion of the carbon nanomaterials having the greater defect density to increase a concentration of carbon in the molten solution effective to fabricate a respective type of iron casting from a plurality of iron casting types.

12. The method of claim 11, wherein the carbon nanomaterials further comprise buckyballs, fullerenes, and combinations thereof.

13. The method of claim 11, wherein the at least a portion of the carbon nanomaterials dispersed in the iron castings are separate and distinct from the solidified carbon in the iron casting.

14. The method of claim 11, wherein at least a portion of the carbon nanotubes have a tubular structure.

15. The method of claim 11, further comprising varying a concentration of carbon dissolved in the iron solution.

16. A method for fabricating iron castings for a metallic component, comprising:
forming a molten solution by melting iron and carbon, and the carbon dissolved in the melted iron;
combining the molten solution with carbon nanomaterials, a first portion of the carbon nanomaterials dispersed in the molten solution;
functionalizing the carbon nanomaterials such that one or more chemical moieties are associated therewith;
transferring the molten solution to a mold;
cooling the molten solution in the mold to solidify the carbon dissolved in the melted iron to fabricate the iron castings, the iron castings having the first portion of the carbon nanomaterials dispersed therein, and at least a portion of the carbon dissolved in the melted iron solidified about the first portion of the carbon nanomaterials, wherein the carbon nanomaterials comprise carbon nanotubes, wherein the functionalizing is configured to vary a number of nucleation sites for the solidification of said at least portion of the carbon dissolved in the molten solution based on the one or more chemical moieties associated with the carbon nanomaterials; and dispersing a second portion of the carbon nanomaterials in the melted iron of the molten solution, the second portion of the carbon nanomaterials having a defect density greater than a defect density of the first portion of the carbon nanomaterials, wherein the greater defect density of the second portion of the carbon nanomaterials is arranged to achieve a lower melting point in the second portion of the carbon nanomaterials compared to a melting point of the first portion of the carbon nanomaterials dispersed in the iron castings, wherein a temperature of the molten solution is controlled during the fabricating of the iron castings to preferentially dissolve the second portion of the carbon nanomaterials having the greater defect density to increase a concentration of carbon in the molten solution effective to fabricate a respective type of iron casting from a plurality of iron casting types.

17. The method of claim 16, wherein the carbon nanomaterials further comprise buckyballs, fullerenes, and combinations thereof.

18. The method of claim 16, further comprising varying a concentration of carbon dissolved in the melted iron.

19. The method of claim 16, wherein the carbon nanotubes have a tubular structure and said at least portion of the carbon dissolved in the melted iron solidifies about a sidewall of the tubular structure.

20. The method of claim 16, wherein the carbon nanotubes have a tubular structure and said at least portion of the carbon dissolved in the melted iron solidifies about an end of the tubular structure.

* * * * *